United States Patent
Kean et al.

(10) Patent No.: US 10,831,213 B2
(45) Date of Patent: Nov. 10, 2020

(54) TARGETED LOADING ASSISTANCE SYSTEM

(71) Applicant: Deere & Company, Moline, IL (US)

(72) Inventors: Michael G. Kean, Maquoketa, IA (US); Mark J. Cherney, Dubuque, IA (US)

(73) Assignee: Deere & Company, Moline, IL (US)

( * ) Notice: Subject to any disclaimer, the term of this patent is extended or adjusted under 35 U.S.C. 154(b) by 183 days.

(21) Appl. No.: 15/941,027

(22) Filed: Mar. 30, 2018

(65) Prior Publication Data
US 2019/0302794 A1   Oct. 3, 2019

(51) Int. Cl.
| | |
|---|---|
| *E02F 9/20* | (2006.01) |
| *B66C 13/40* | (2006.01) |
| *G05D 1/02* | (2020.01) |
| *B66F 9/075* | (2006.01) |
| *G07C 5/08* | (2006.01) |

(52) U.S. Cl.
CPC .......... *G05D 1/0246* (2013.01); *B66C 13/40* (2013.01); *B66F 9/07581* (2013.01); *E02F 9/205* (2013.01); *G05D 2201/0202* (2013.01); *G05D 2201/0216* (2013.01); *G07C 5/0841* (2013.01)

(58) Field of Classification Search
CPC ..................................................... B65G 67/04
See application file for complete search history.

(56) References Cited

U.S. PATENT DOCUMENTS

| | | | |
|---|---|---|---|
| 7,729,834 B2* | 6/2010 | Meyer Zu Helligen | A01B 69/001 701/50 |
| 8,538,579 B2* | 9/2013 | Cottone | B25J 9/1697 700/217 |
| 9,523,180 B2 | 12/2016 | Deines | |
| 2010/0272547 A1* | 10/2010 | Cottone | B25J 9/1697 414/426 |
| 2015/0308070 A1* | 10/2015 | Deines | E02F 9/24 701/50 |
| 2016/0229326 A1 | 8/2016 | Uetake et al. | |
| 2017/0096797 A1 | 4/2017 | Robertson et al. | |

(Continued)

FOREIGN PATENT DOCUMENTS

| | | |
|---|---|---|
| DE | 10323643 A1 | 1/2005 |
| DE | 102008030546 A1 | 12/2009 |

(Continued)

OTHER PUBLICATIONS

German Search Report issued in counterpart application No. 102019203300.8 dated Jul. 15, 2019. (12 pages).

*Primary Examiner* — Thomas G Black
*Assistant Examiner* — Ana D Thomas
(74) *Attorney, Agent, or Firm* — Joseph R. Kelly; Kelly, Holt & Christenson, PLLC

(57) ABSTRACT

A targeted loading assistance system includes a work machine having a load carrying mechanism. The system includes a sensor that detects a location of the target loading zone relative to the work machine and generates a location signal indicative of the location of the work machine. The system also includes a path calculation component that receives the location signal and calculates a control path for the work machine to reach the target loading zone. The system also includes a control component that generates a control signal to guide the work machine along the control path.

20 Claims, 9 Drawing Sheets

(56) References Cited

U.S. PATENT DOCUMENTS

2017/0212517 A1\*  7/2017  Houle .................. B60W 50/14
2018/0089616 A1   3/2018  Jacobus et al.

FOREIGN PATENT DOCUMENTS

| DE | 112012004057 T5 | 7/2014 |
| EP | 0800129 B1 | 7/2000 |
| EP | 2155592 B1 | 10/2012 |

\* cited by examiner

TARGETED LOADING ASSISTANCE SYSTEM

FIELD OF THE DESCRIPTION

The present description relates to loading assistance. More specifically, the present description relates to generating load assistance based on a position of a work machine, a position of the target zone and a measure of a load on the work machine.

BACKGROUND

There are many different types of work machines. Some such work machines include agricultural machines, construction machines, forestry machines, turf management machines, among others. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator.

Many of these work machines are often tasked with transporting load across, into, or out of a worksite, in accordance with a worksite operation. Different worksite operations may include moving load from one location to another or leveling a worksite, etc. During a worksite operation, a variety of work machines may be used, including articulated dump trucks, wheel loaders and excavators, among others. Worksite operations may involve a large number of steps or phases, such as loading material into trucks, or another receiving area, or other steps or phases and they may be quite complex.

The discussion above is merely provided for general background information and is not intended to be used as an aid in determining the scope of the claimed subject matter.

SUMMARY

A targeted loading assistance system includes a work machine having a load carrying mechanism. The system includes a sensor that detects a location of a target loading zone relative to the work machine and generates a location signal indicative of the location of the work machine. The system also includes a path calculation component that receives the location signal and calculates a control path for the work machine to reach the target loading zone. The system also includes a control component that generates a control signal to guide the work machine along the control path.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

In carrying out a worksite operation, it may be desired to quickly and safely transport load into, around or out of the worksite. As speed of transportation of loads is increased, the risk of a collision between work machines, dropping or otherwise damaging a load or colliding with other objects can also increase. Accordingly, the present description is directed to assisting an operator in performing these types of operations.

Figure 1:
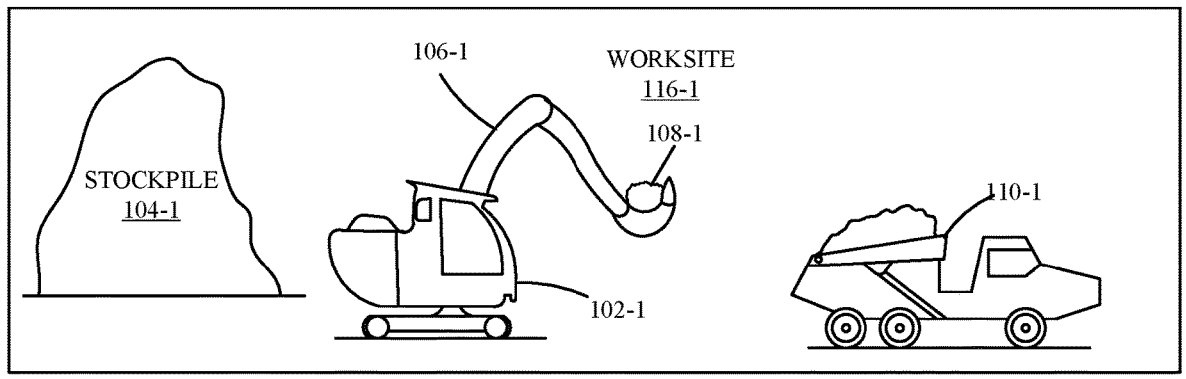
FIG. 1 is a diagram of several examples of worksite architectures.
Figure 1:
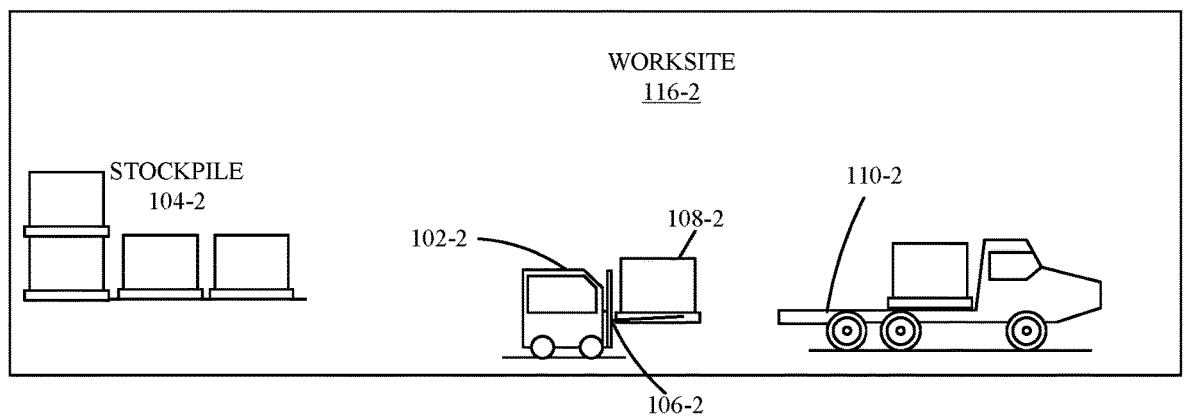
Figure 1:
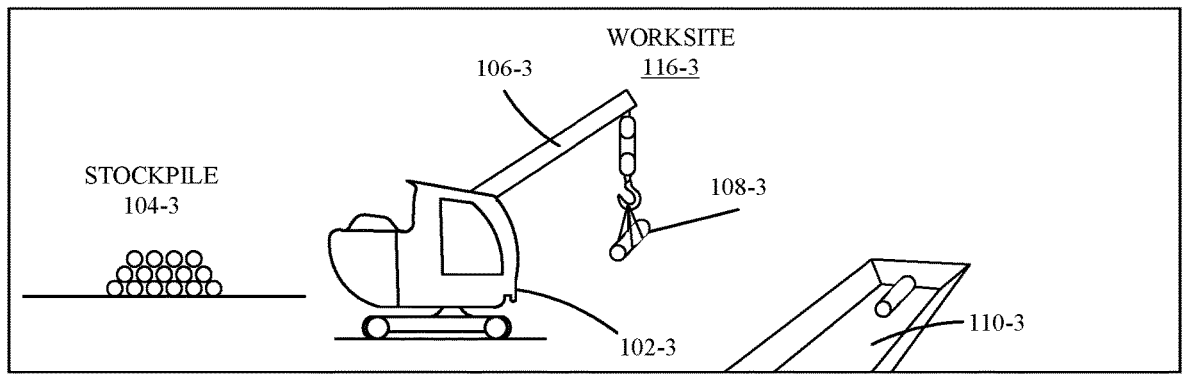

FIG. 1 is a diagram 100 of several examples of worksite architectures. In FIG. 1 a plurality of worksites, work machines, stock piles, loads and target zones are shown, they are referred to generally as worksite 116, work machine 102, stockpile 104, load carrying mechanism 106, load 108 and target zone 110. Each worksite 116 has a stockpile 104 where a load to be moved is stored. As shown, there is one stockpile 104 per worksite 116, however, there may be many stockpiles 104 per worksite 116. A load 108 from stockpile 104 is moved by a work machine 102. Work machine 102 can have a load carrying mechanism 106 that aids in moving the load 108. Work machine 102 transports a load 108 from a first position (such as stockpile 104) to an unloading area (e.g. a target zone 110). This transportation requires some force to accelerate the load 108 from stockpile 104 and then a force to decelerate the load 108 as it approaches target zone 110. A worksite 116 may also include other machines or objects. In some cases, these other objects need to be avoided during transportation of load 108.

In the example illustrated, worksite 116-1 is an aggregate worksite so the stockpile 104-1 and load 108-1 comprise aggregate. Load 108-1 is transported by work machine 102-1, which is an excavator. The excavator has load carrying mechanism 106-1 that comprises a boom, arm/stick and a bucket. Target zone 110-1 is a dump truck. For the aggregate in stockpile 104-1 to be loaded into the dump truck 110-1 the excavator 102-1 has to be within range of the dump truck 110-1 and the bucket has to clear the sidewalls on the bed of the dump truck 110-1. One circumstance involved with aggregate or liquid loads is a potential load runoff hazard. That is, the load 108-1 can spill off the sides of the excavator bucket or the sides of the dump truck 110-1.

In another example, worksite 116-2 is a pallet loading worksite so the stockpile 104-2 and load 108-2 comprises a pallet(s). Load 108-2 is transported by work machine 102-2, which is a forklift. The forklift 102-2 has load carrying mechanism 106-2 that comprises a mast arm and forks. Target zone 110-2 is a flatbed truck. For the pallet 108-2 to be loaded onto the flatbed truck 110-2 the forklift 102-2 has to be within range of the flatbed truck 110-2, and the forks have to clear the bed of the flatbed truck 110-2. One circumstance involved with stacked loads is there is a potential tipping hazard or load loss hazard. A tipping hazard can mean the load tips off of the pallet or the entire forklift with its load tips over.

In another example worksite 116-3 is a trenching and pipe laying worksite so the stockpile 104-3 and load 108-3 comprise pipes. Load 108-3 is transported by work machine 102-3, which is a crane. The crane has load carrying mechanism 106-3 that comprises a boom, cables, straps and hook (it could also be a grapple or other mechanism). Target zone 110-3 is a trench. For the pipe 108-3 to be placed properly into the trench 110-3, the crane 102-3 has to be within range of the trench 110-3 and the hook 106-3 has to be properly aligned above the trench 110-3. One circumstance involved with hanging loads is that there is a potential swinging load hazard. That is, the work machine may suddenly stop or start (or accelerate or decelerate too quickly) and this causes the load to swing into an object or swing back and hit the work machine.

There are many other worksite architectures and load carrying scenarios as well. These shown in FIG. 1 are examples only.

Figure 2:
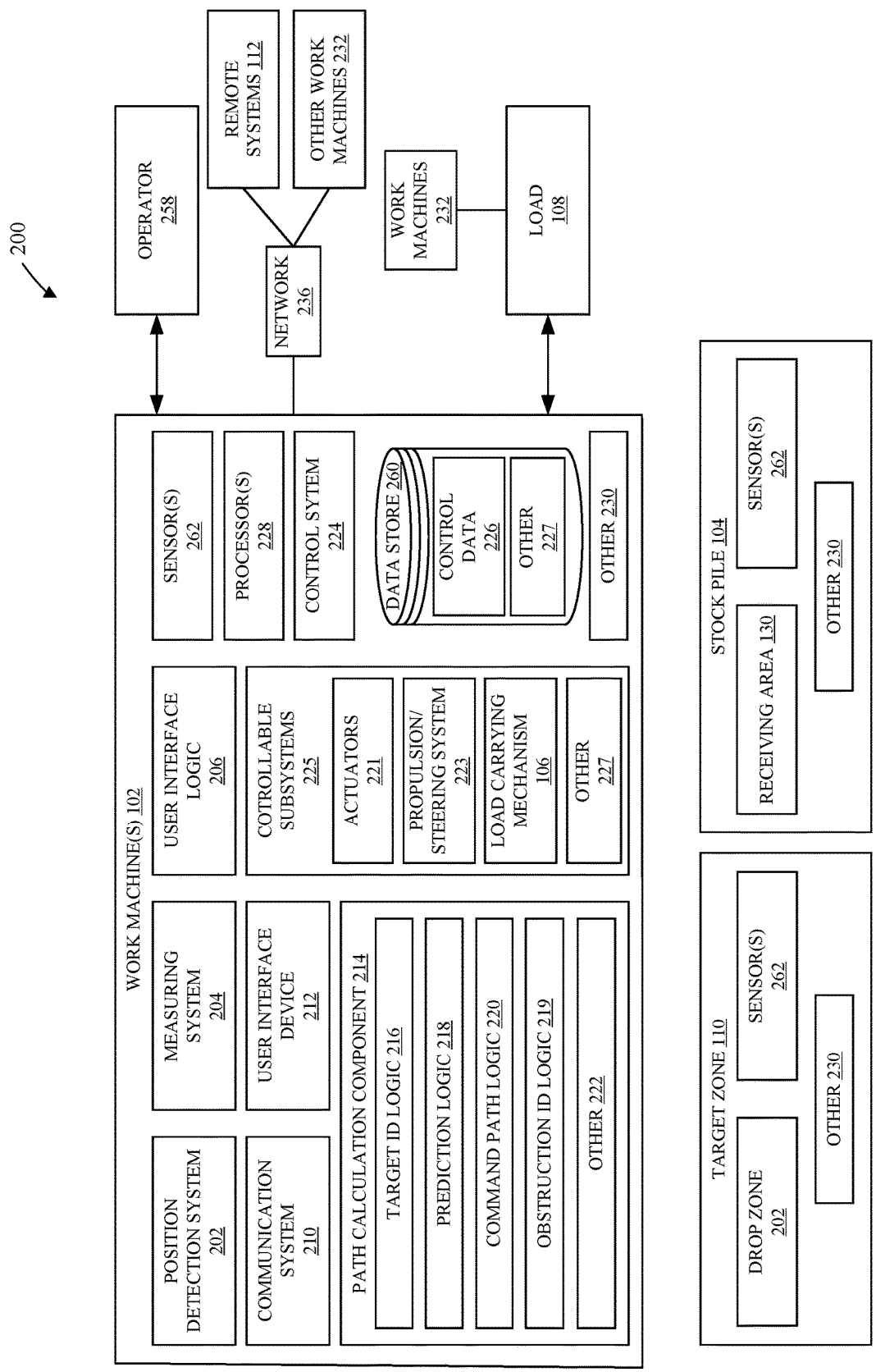
FIG. 2 is a block diagram of an example of a loading architecture.

FIG. 2 is a block diagram of an example loading architecture 200. Loading architecture 200 illustratively comprises work machine 102, operator 258, stockpile 104, target zone 110, network 236, remote systems 112, other work machines 232 and load 108. Network 256 can be any of a wide variety of different types of networks, such as a wide area network, a local area network, a near field communication network, a cellular network, or any of a wide variety of other networks of combinations of networks.

Before describing the operation of work machine 102 in more detail, a brief description of some of the items in work machine 102, and their operation, will first be provided. Work machine 102 illustratively includes a communication system 210, a control system 224, controllable subsystems 225, user interface logic 206, a user interface device 212, one or more processors 228, one or more sensors 262, data store 260, position detection system 202, measuring system 204, load carrying mechanism 106, path calculation component 214, and a wide variety of other items 230. Path calculation component 214 includes target identification logic 216, prediction logic 218, command path logic 220 and it can include a variety of other logic 222. Data store 260 comprises control data 226 and it can include other data 227. Control data 226 can store information indicative of the signals needed to execute certain commands on machine 102 and other control related data. For instance, control data 226 can contain the maximum and minimum positions of any actuator 221 or can contain the maximum/minimum speeds/accelerations of any actuator 221, propulsion/steering 223 or other 227 system that controls subsystems 225. Other data 227 can, in one example, comprise identifying information that identifies one or more target zones 110.

Control system 224 can generate control signals for controlling a variety of different controllable subsystems 225 based on sensor signals generated by sensors 262, based on feedback received from remote system 112 or control system 224, based on operator inputs received through operator interface device 212, or it can generate control signals in a wide variety of other ways as well. Controllable subsystems 225 can include a wide variety of mechanical, electrical, hydraulic, pneumatic, computer implemented and other systems of work machine 102, such as propulsion/steering system 223 that controls the movement of the machine 102, the actuators 221 that control the operation that is performed, and other controllable features as indicated by block 227. Communication system 210 can include one or more communication systems that allow items in work machine 102 to communicate with one another (such as over a controller area network-CAN bus, etc.) and also allows work machine 102 to communicate with remote system(s) 112 and/or other work machine(s) 232 over network 236. User interface device 212 can include display devices, mechanical or electrical devices, audio devices, haptic devices, and a variety of other devices. In one example, user interface logic 206 generates an operator display on user interface device 212 which can include a display device that is integrated into an operator compartment of work machine 102, or it can be a separate display on a separate device that can be carried by operator 258 (such as a laptop computer, a mobile device, etc.).

Path calculation component 214 can generate load handling indicators based on inputs from position detection system 202, measuring system 204, control data 226, sensor(s) 262, etc. The load handling indicators can be, for instance, a set of control signals that will guide a work machine 102 along a machine path.

Position detection system 202 can be one or more of a global positioning system (GPS) receiver, a LORAN system, a dead reckoning system, a cellular triangulation system, or other positioning system. In one example, position detection system 202 is configured to associate signals obtained by sensors 262 with a geospatial location, such as a location within a worksite. Additionally, in one example, based on a position of work machine 102, a location of a load of material can also be determined using known spatial relationships between a load carrying mechanism 106 of work machine 102 and the location of work machine 102. As such, when work machine 102 moves around a worksite, a position of work machine 102 can be determined or a position of a load 108 carried by work machine 102 can be determined, or both. In some examples, a position of work machine 102 can be determined intermittently, however, it is also expressly contemplated that a position of work machine 102 can be determined continuously and/or whenever work machine 102 moves to a new location within a worksite.

Measuring system 204 is configured to determine a measure of a load 108 located in load carrying mechanism 106 of work machine 102. A measure can include a weight, pressure, force, volume, heaviness or mass of material located within load carrying mechanism 106 of work machine 102, among other things. A measure can provide an indication of a type of load 108 carried by carrying mechanism 106, i.e. aggregate, pipe, log, stacked pallet, etc. A measure can include physical dimensions of the load 108. A measure can also be a position of the load 108 relative to the load carrying mechanism 106.

As an example, assume work machine 102 includes an articulated dump truck, even though it is to be understood that a variety of work machines can be used. In this example, load carrying mechanism 106 is a bin selectively moveable between a loading position and a tipping position through an extension of lift cylinders on the articulated dump truck, and sensors 262 include weight sensors which can include strain gauges, or other sensors that sense the weight of the material in the bin. Upon receiving material in load carrying mechanism 106, measuring system 204 can determine a measure of the material, which can include a weight, using signals provided from sensors 262, e.g. strain gauges.

As another example, assume work machine 102 includes a log loader. In this example, load carrying mechanism 106 is a grapple. The measure can include an indication, sensed for example with a visual sensor, of how far a log extends in either direction from the grapple holding the log. The measure can include a weight of the log as indicated by sensors 262 coupled to the grapple. The measure can also include a grip quality. A grip quality can be detected at least in part with sensors 262 coupled to the hydraulic grapple holding the log. The grip quality can also be determined in part by a sensor 262, where the sensor is a visual sensor, sensing a position on the log where the log is gripped, e.g. a log gripped in the middle typically has better grip quality than a log gripped near its end.

Further, load carrying mechanism 106 can also include a digging mechanism that executes dig and dump operations, (e.g. in the example in which work machine 102 is a wheel loader or excavator). The work machine 102 can be an excavator with a hydraulically-powered cylinder or cylinders that move the digging mechanisms. In this example, measuring system 204 can measure a pressure differential across the cylinder(s) and a position of extension of the cylinder(s), to determine a measure and position of a load 108. In other examples, measuring system 204 can receive signals from sensors 262 which include optical sensors, ultrasonic sensors, scales, etc. to determine a measure of a load of material.

Upon receiving an indication of position, control data and an indication of measure from position detection system 202, control data 226 and measuring system 204, respectively, path calculation component 214 is configured to identify a target zone 110 and generate a command path that can be used to control machine 102 to move the load to target zone 110.

Target identification logic 216 receives signals from sensors 262 to identify target zone 110. In one example, the sensor is a visual or optical sensor that detects an image indicative of a boundary of the target zone. For example, this could be done using colors or patterns to delineate the physical boundaries of a truck bed, flags along the side of a trench or the walls or opening of the trench itself, etc. It could also be based on a context sensitive visual recognition system that identifies the edges of a truck, trench, group of trees, etc. Once a target zone 110 is identified, the drop zone 202 is identified. The drop zone 202 is where a load 108 can be dropped within the target zone 110. Also, in one example, the system can generate a virtual bounding box around drop zone 202 to aide path calculation component 214 in performing path generation.

Obstruction identification logic 219 receives signals from sensors 262 to identify any objects that may hinder the progression of load 108 to the target zone 110 in any way. Some examples of objects include other work machines, certain types of terrain, equipment at a worksite, etc. Obstructions may also be a part of target zone 110. For example, obstructions can include log retaining arms on a log hauling truck which need to be cleared for the log to be loaded. Objects identified by obstruction identification logic 219 can have virtual bounding boxes designated around them to aide in path generation/collision detection, as is described below.

Prediction logic 218 receives signals from sensors 262, measuring system 204 and/or other components 230. Functions of prediction logic 218 are determined by the type of work machine 102 and load 108. Generally, prediction logic 218 can receive control data 226, indicative of the possible accelerations of work machine 102 and all of its sub components. Prediction logic 218 may also receive inputs from measuring system 204, indicative of the size, mass, load distribution, etc. of a load 108 carried by machine 102. Prediction logic 218, generally, predicts a likelihood of a potential hazard and if the likelihood exceeds a threshold value, controls the machine 102 accordingly. For instance, it can modify a machine command or machine travel path, machine speed, etc.

One example of the operation of prediction logic 218 will now be provided in a scenario where the work machine 102 is an excavator similar to work machine 102-1 in FIG. 1. Prediction logic 218 can receive control data 226, indicative of the maximum acceleration of the excavator, as well as minimum(min)/maximum(max) height of the bucket at full extension, min/max bucket tilt, min/max bucket/boom/stick acceleration, min/max boom swing speed/acceleration, bucket max load, max clearance height, etc. Prediction logic 218 may also receive inputs from measuring system 204, indicative of the mass, load distribution, load type, etc. of a load 108 carried by the excavator. Predication logic 218 combines data from these sources and determines a max acceleration/deceleration that the work machine 102 and its load can undergo, while inhibiting or minimizing a runoff hazard of load 108, tipping hazard of the excavator 102-1, or collision, etc. Machine 102-1 is then controlled by control system 224 so the accelerations and decelerations are within the predicted levels.

One example of the operation of prediction logic 218 will now be provided in a scenario where the work machine 102 is a forklift similar to work machine 102-2 in FIG. 1. Prediction logic 218 can receive control data 226, indicative of the minimum(min)/maximum(max) speed/acceleration of the forklift, as well as min/max clearance height, max/min fork tilt speed/acceleration, max fork lift speed/acceleration, fork max load, etc. Prediction logic 218 may also receive inputs from measuring system 204, indicative of the mass, load distribution, stack quality, height, etc. of a load 108 carried by the forklift. Predication logic 218 combines data from these sources and determines a max acceleration/deceleration the work machine 102 and its forks can undergo, without a tipping hazard of load 108 or the forklift. In some examples, when a heavy load 108 is high in the air, acceleration may need to be reduced to prevent the forklift from tipping. In some examples, when a load 108 is poorly distributed (e.g. top heavy) or poorly stacked, there may not be a forklift tipping hazard but a load 108 tipping/loss hazard. The forklift 102-2 is then controlled by control system 224 to keep its accelerations and decelerations within the predicted levels.

One example of the operation of prediction logic 218 will now be provided in a scenario where the work machine 102 is a crane similar to work machine 102-3 in FIG. 1. Prediction logic 218 can receive control data 226, indicative of the minimum(min)/maximum(max) speed/acceleration of the crane, as well as min/max lift height, cable length, max lift acceleration/speed, max load, etc. Prediction logic 218 may also receive inputs from measuring system 204, indicative of the mass, load distribution, grip quality, height, length, etc. of a load 108 carried by the crane. Predication logic 218 combines data from these sources and determines a max acceleration/deceleration the work machine 102 and its boom can without encountering a swinging hazard of load 108. A swinging hazard can occur if the swinging load 108 collides with the work machine 102 or another object. A swinging hazard can also occur if the force of the swing tips the work machine 102 or otherwise renders it unstable. A swinging hazard can also occur if the force of the swing overcomes the force of the grip and the swinging load 108 is lost. A swinging hazard can also occur in various other ways. The crane 102-3 is controlled by control system 224 to keep its accelerations and decelerations within the predicted levels.

In the above examples, the machine 102 is controlled based on the predicted levels of acceleration and deceleration that will avoid a certain hazard. These are examples only and other items can be predicted by logic 218 and used to accomplish other desired controls of machine 102.

Command path logic 220 generates a command path for the work machine 102 and its components to move a load 108 to a target zone 110. Command path logic 220 can be coupled to prediction logic 218, obstruction identification (ID) logic 219, target identification (ID) logic 216 and any other component in system 200. Command path logic 220 can utilize control data 226 to determine which signals to generate in order to produce a desired function. Command path logic 220 receives an initial location from position detection system 202, a target location from target ID logic 216 and obstruction locations from obstruction ID logic 219. Command path logic 220 then generates a path that machine 102 can travel along, from the initial location to the target location and avoid any obstruction locations. Command path logic 220 sends the path to prediction logic 218 which determines the likely limits of safe accelerations and decelerations that work machine 102 and its components can experience during path navigation without encountering a hazard.

For example, a generated path may have a 90 degree turn and a work machine 102 navigating this path can make turns that produce 1 g of force on a load. Prediction logic 218 may determine that a work machine 102 can only undergo 0.5 g without losing part of the load. This determination by prediction logic 218 is taken into account by command path logic 220, which then will generate signals that limit the operation of the work machine 102, so that during its travel along the path it will only experience 0.5 G on its load. Therefore, for instance, machine 102 may be slowed down during the 90 degree turn, or where it is traveling over rough terrain, or as it approaches the target zone 110 or it may be controlled in other ways so the acceleration and deceleration on the load are limited to the predicted levels.

As another example, prediction logic 218 can generate signals used to control machine 102 to avoid a collision, for instance it can generate values that are used to limit one or more of the ground speed of the work machine 102 or speeds of controllable subsystems 225 to ensure the load carrying mechanism 106 and/or the carried load 108 do not intersect with the boundaries surrounding the drop zone 202 or with an obstacle.

For example, on an excavator, assume that command path logic 220 commands the boom to lift and the house to swing. Assume further that there is an obstacle that the load must clear as machine 102 is swinging it. Prediction logic 218 then checks the speeds at which the boom is rising and swinging to determine if the boom is rising fast enough so the load will clear the obstacle. If not, prediction logic 218 generates signals used to slow down the swing so that the boom is rising faster relative to the swing motion and so the load will clear the obstacle. In a loader, prediction logic 218 can generate signals used to limit ground speed to ensure the boom/bucket clears an obstacle along its travel path and so the loader does not run into the target zone 110, e.g. a truck.

Prediction logic 218 can generate values that are used for synchronizing multiple functions as well, for instance, command path logic 220 can use signals generated by logic 218 to control both the boom and arm simultaneously or synchronously to avoid a collision or loss of load 108. In this way the system can be controlled to move as fast as it can go while avoiding obstacles and other hazards.

Command path logic 220 can generate a path that can be acted on to control machine 102 in a fully autonomous manner. For instance, the path can be used by control system 224 to guide work machine 102 from stock pile 104 to target zone 110 without any ongoing input from operator 258. Command path logic 220 can also generate a path that is semi-autonomous. For instance control system 224 can use the path to guide the work machine 102 to the target zone 110, but the operator 258 then manually drops the load. Another example of a semi-autonomous path would have operator 258 control machine 102 to pick-up the load from receiving area 130 and get within a detectable range of target zone 110, at which point command path logic 220 would generate a path to target zone 110. These and other scenarios are contemplated herein.

The components in FIG. 2 are illustratively shown on various systems. For example, the path calculation component 214 and measuring system 204 are shown as part of work machine 102. However, any of these components or systems can be located remotely from the work machine 102. For example, the target zone 110 can be a dump truck, which has components which can accomplish the functions of measuring system 204, sensors 262, path calculation component 214, etc. They can be located elsewhere as well.

Figure 3:
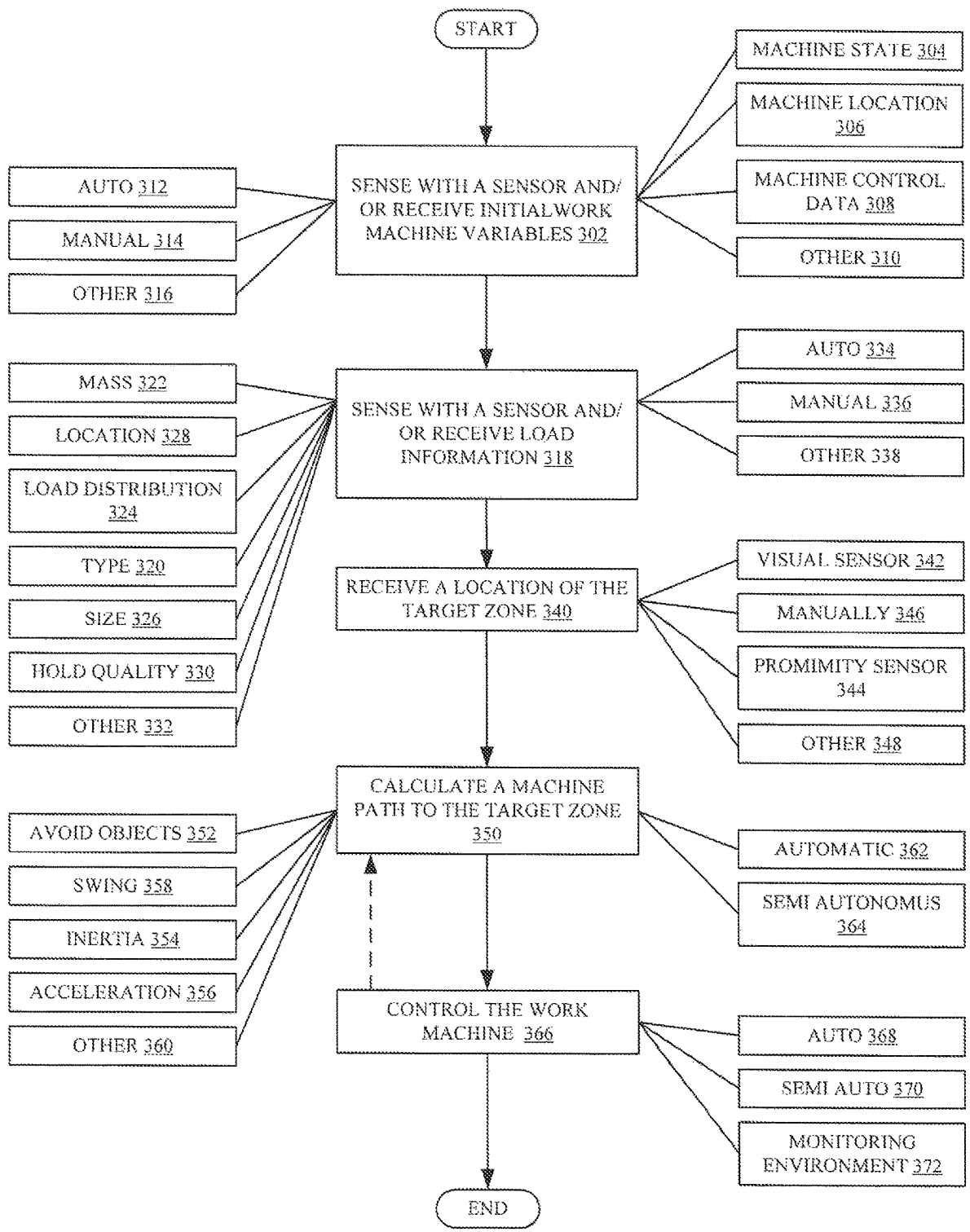
FIG. 3 is a flowchart showing an example of an operation of controlling a work machine to transport a load to a target zone.

FIG. 3 is a flowchart of an example of the operation control system 224 in of controlling a work machine to transport a load to a target zone. The example operation begins at block 302 where initial work machine variables are received by the path calculation component 214. Some examples of work machine variables include machine state 304, machine location 306, machine control data 308 and other data may also me received as indicated by block 310. Machine state 304 can include the position, speed and acceleration of all work machine components. Machine location 306 can include the absolute or target-relative location of the work machine. Machine control data 308 can include information used in controlling the various machine components. For example, max/min positions of a component, dump clearance at max height, max/min speed of the component, control signals needed to actuate the component, max component load, etc.

Initial work machine variables can be received by path calculation component 214 automatically as indicated by block 312, manually as indicated by block 314 or can be received in other ways as indicated by block 316. Automatically receiving variables can include receiving variables from sensors 262 or retrieving them from a datastore 260, etc. Manually receiving variables can include an operator manually entering the variables. In some instances, an operator may manually enter some variables while other variables are automatically received/sensed.

At block 318, load information is received by the path calculation component 214. Receiving of load information may be automatic 334, manual 336 or can be received in other ways as indicated by block 338. Automatic load information may be detected by a variety of different sensors. As examples, a visual sensor may be able to detect hold quality, load distribution, load type, size, etc. A hydraulic pressure sensor may be able to detect a mass of a carried load. Automatic load information may also be received from a different source. As an example, a pallet that has an information barcode, RFID tag or other identifier that contains load information that can be read by a reader on machine 102. Manual load information may be received from an operator or other user.

Some examples of load information include load type 320, load mass 322, load distribution 324, load size 326, load location 328, hold quality 330, and other information may also be received as indicated by block 332. Load type 320 can indicate what type of load is being carried. For example, a pallet, log, pipe, aggregate, etc. Load type 320 can further indicate what the load is. For example, a pallet of brick and a pallet with a motor on it, or a sand aggregate and a rock aggregate. Identifying the type can be useful, for example, because a sand aggregate may have different runoff characteristics than a rock aggregate. Similarly, a pallet of brick could be more balanced than a pallet with two motors on it. Load mass 322 can indicate the mass of the load being carried. Mass is a variable that can be used in many different calculations, e.g. inertia, swing, tipping, etc. Load distribution 324 can indicate the center of mass or other forms of load distribution. Load distribution is a variable that can be used in many different calculations, e.g. inertia, swing, tipping, etc. Load size 326 can indicate the physical dimensions of the load. Load size is a variable that also can be used in many different calculations especially in collision detection and avoidance calculations. Location 328 can indicate the physical location of the load. Hold quality 330 can indicate the quality of the hold on the load. As examples, a poorly stacked or secured pallet could have a low hold quality. A load of aggregate where there is a high pile near the edge of the bucket would also have a low hold quality because the aggregate is more likely to run off of the bucket than if the high pile was in the center of the bucket. A load where a log is held near an end, such that only one of two gripping mechanisms has a grip on it, would have a lower hold quality than a log held in the middle by both gripping mechanisms. A hanging load that is secured by one hanging point may have a different hold quality than a hanging load that is secured by two hanging points. All of these can be detected using cameras or other sensors.

At block 340, a location of the target zone is received by the path calculation component 214. The location of the target zone can be received in a number of different ways including, but not limited to, a visual sensor as indicated by block 342, a proximity sensor as indicated by block 344, manually as indicated by block 346 and can be received in other ways as indicated by block 348. An example of utilizing a visual sensor to locate the target zone can include receiving target identification (ID) information from a data store. Target ID information can include information used to identify a target. In one example, the target ID information can be a known image of the target. In another example, the target ID information includes visual characteristics of the target. The target ID information is then compared to an image captured by a visual sensor on machine 102 to identify and locate the target zone. An example of utilizing a proximity sensor such as lidar, radar or other proximity sensors include receiving sensor signals and identifying the target zone based on those signals. In one example, the target zone may have identifying components such as flags, reflectors, etc. that the sensor detects to confirm the location of the target zone. An example of manually identifying the location of a target zone includes entering GPS coordinates or selecting the target zone on a map or image of the worksite.

At block 350, a machine path to the target zone is calculated by path calculation component 214. When calculating a path, a variety of factors can be accounted for. One factor includes avoiding other objects as indicated by block 352. There are many known methods of driving around a detected object. However, these methods do not account for other factors. For example, using the variables received in block 302 and block 318 the path calculation component 214 can calculate the inertia of a work machine and its load and prediction logic 218 can use this to predict the motion of the work machine and its load, as indicated by block 354. Prediction logic 218 can use inertia to predict runoff, tip and swing hazards. Prediction logic 218 can use inertia to predict the deceleration/acceleration of the vehicle. Deceleration/acceleration factors are indicated by block 356.

Another potential factor used in calculating a path is the swing of a load, as indicated by block 358. Using the variables received in block 302 and block 318, a swing hazard can be calculated. For example, the boom height and speed, with the load weight and suspension length can be used to predict the swing of a load. Of course, more complex swing calculations using more variables can also be completed.

Once a path to the target zone is determined by path calculation component 214 the work machine is controlled by control system 224 to follow this path, as indicated by block 366. Control the vehicle may be fully automatic, as indicated by block 368, or semi-automatic, as indicated by block 370. During control the work environment can be monitored as indicated by block 372. If circumstances in the environment change a new path to the target zone may need to be generated at block 350.

Figure 4:
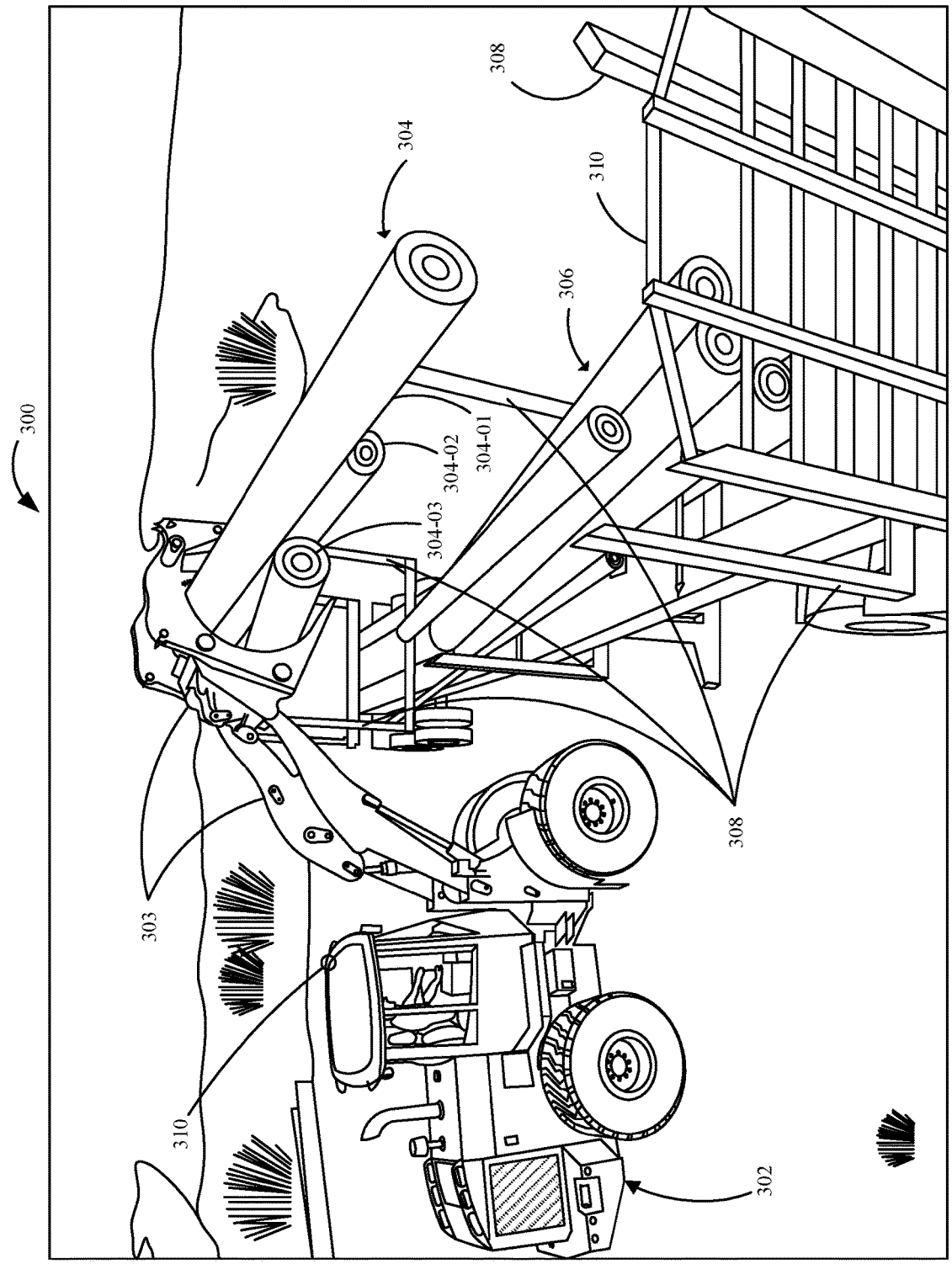
FIG. 4 is an example of a target loading assistance system on a log loader.

FIG. 4 is an example of a target loading assistance system on a log loader. Work environment 300 includes a vehicle 302, a target zone 306, and a load 304. In this example vehicle 302 is a wheel loader. Target zone 306 is the back portion of a log truck, and load 304 includes three logs 304-1, 304-2 and 304-3. Target zone 306 is defined by retaining arms 308 on the log truck. Vehicle 302 utilizes load carrying mechanism 303 to transport load 304 to the target zone 306. In this example, the load carrying mechanism is a high lift arm and grapple. As vehicle 302 approaches target zone 306, the vehicle 302 must decelerate and the load carrying mechanism 303 must raise the load 304 to clear obstructions 308 (the log retaining arms).

In one example, a visual sensor 310 is located on a portion of vehicle 302, load carrying mechanism 303 or target zone 306. Visual sensor 310 captures an image of work environment 300. Utilizing this image, path calculation component 214 identifies, with target identification logic 216, where target zone 306 is located relative to vehicle 302. Then command path logic 220 generates a path to the target zone 306. Prediction logic 218 calculates the speed/acceleration at which vehicle 302 can approach target zone 306 without colliding with target zone 306 and generate signals indicative of the calculated values. Prediction logic 218 can also calculate and synchronize the movement of load carrying mechanism 303 (e.g. its rise speed/acceleration) to prevent load carrying mechanism 303 or load 304 from colliding with obstructions 308 or falling from load carrying mechanism 303. It can also generate other sensor signals that can be used to avoid other hazards or undesirable conditions, such as tipping, improperly dropping the load, etc.

Prediction logic 218 can utilize an image captured by visual sensor 310 and determine a grip on the load 304. For example, logs 304-1, 304-2 and 304-3 are all gripped by load carrying mechanism 303. Log 304-1 is gripped at a distal end of the log and this can be visually detected. Log 304-2 is centered and aligned with the gripping mechanism. Log 304-3 is crooked in the gripping mechanism. Based on these sensed visual characteristics, logs 304-1 and 304-3 may visually be determined by prediction logic 218 to have a poorer grip quality than log 304-2. Having a poorer grip quality can be used by logic 218 to may limit the speed/acceleration encountered by vehicle 302 and load carrying mechanism 303 during its movement along the travel path. This is just one example of using the present system.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
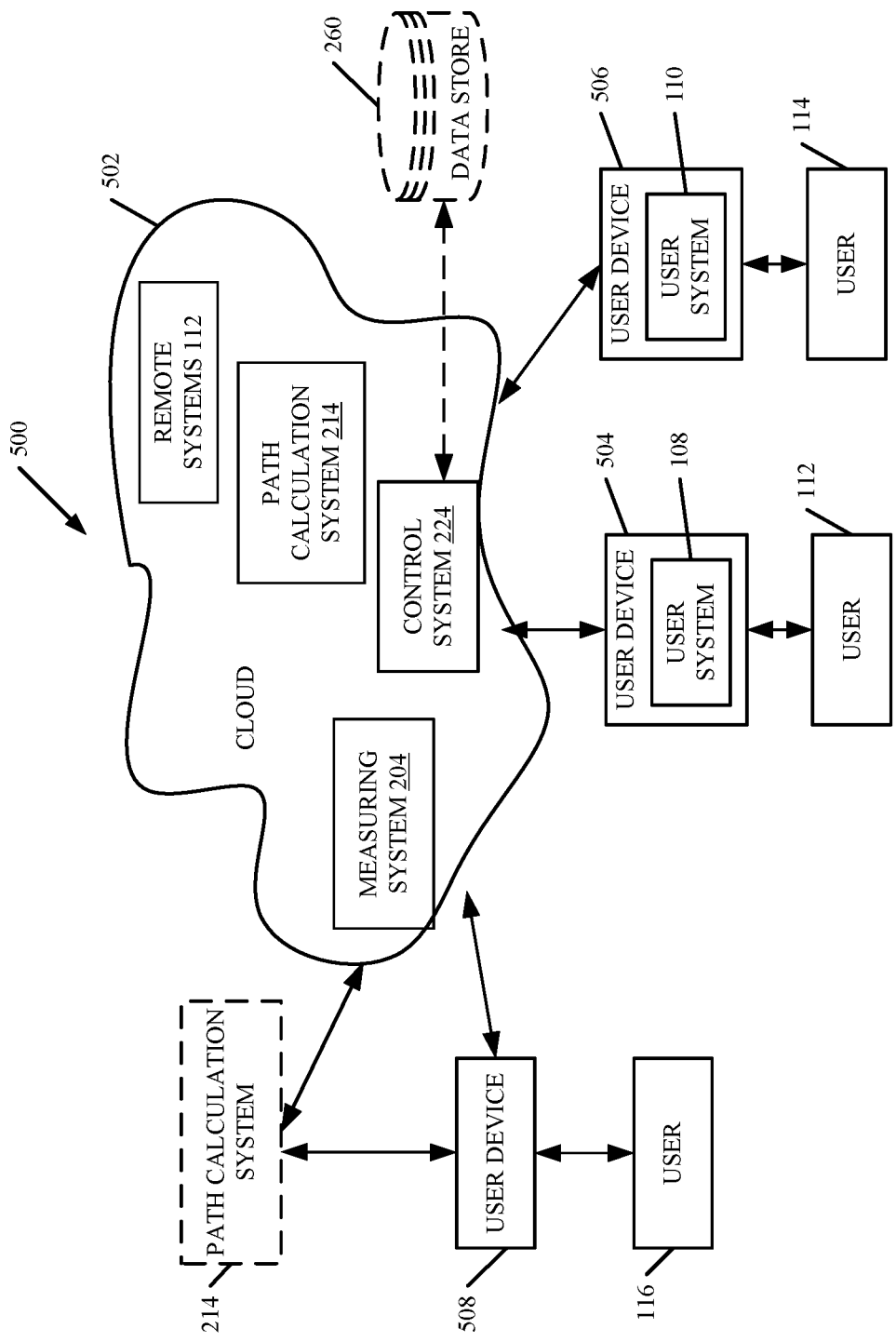
FIG. 5 shows one example of the mobile machine, as part of a cloud computing architecture.

FIG. 5 is a block diagram of path calculation system 214, shown in FIG. 2, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 5, some items are similar to those shown in FIG. 2 and they are similarly numbered. FIG. 5 specifically shows that path calculation component 214, control system 224 and data store 260 can be located at a remote server location 502. Therefore, work machine 102 accesses those systems through remote server location 502.

FIG. 5 also depicts another embodiment of a remote server architecture. FIG. 5 shows that it is also contemplated that some elements of FIG. 2 are disposed at remote server location 502 while others are not. By way of example, remote systems 112 can be disposed at a location separate from location 502, and accessed through the remote server at location 502. Regardless of where they are located, they can be accessed directly by work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another work machine (such as a fuel truck) can have an automated information collection system. As the work machine comes close to the fuel truck for fueling, the system automatically collects the information from the work machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the work machine until the work machine enters a covered location. The work machine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
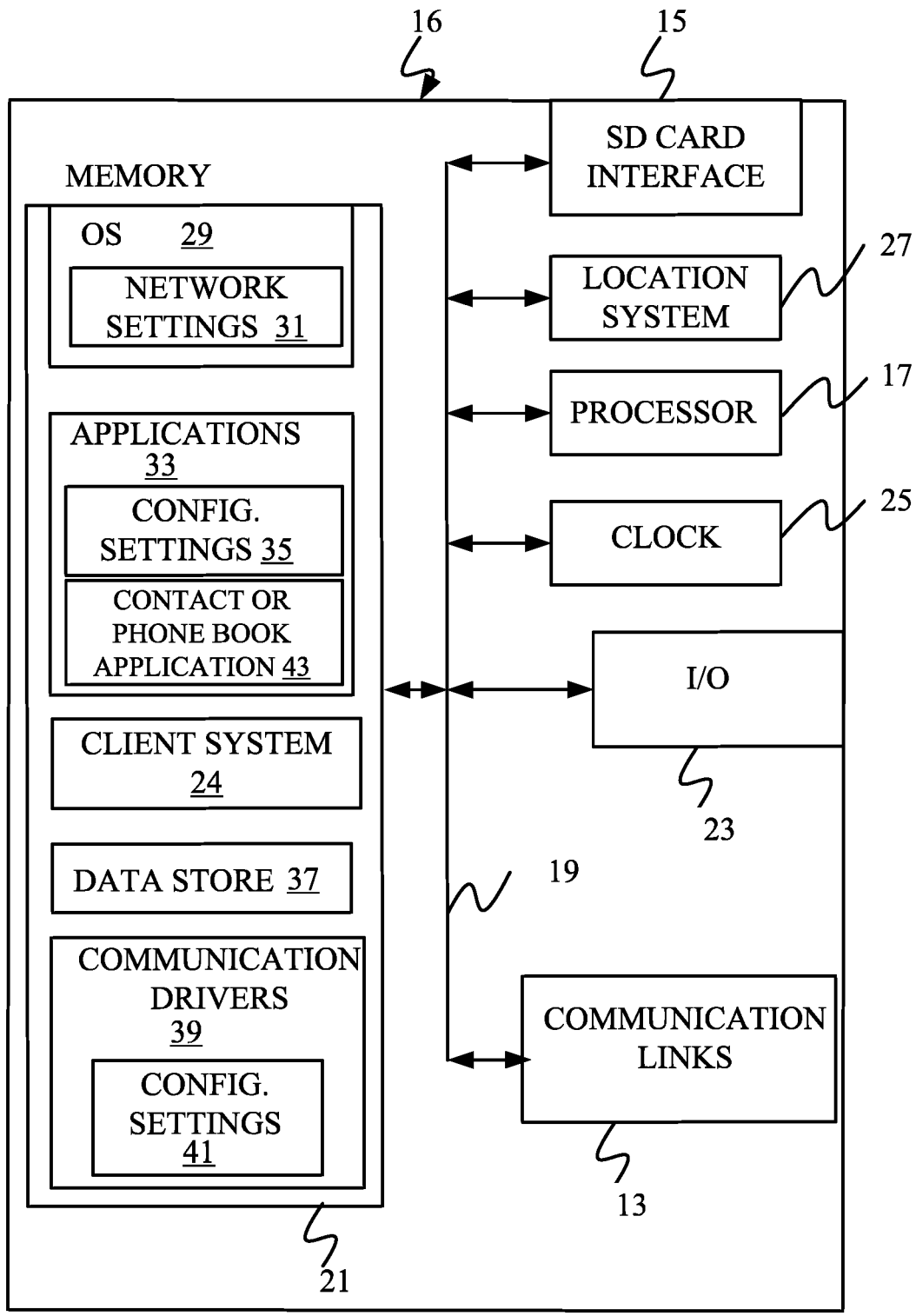
FIGS. 6-8 show examples of mobile devices that can be used with the mobile machine and the cloud computing architectures shown in the previous figures.
Figure 7:
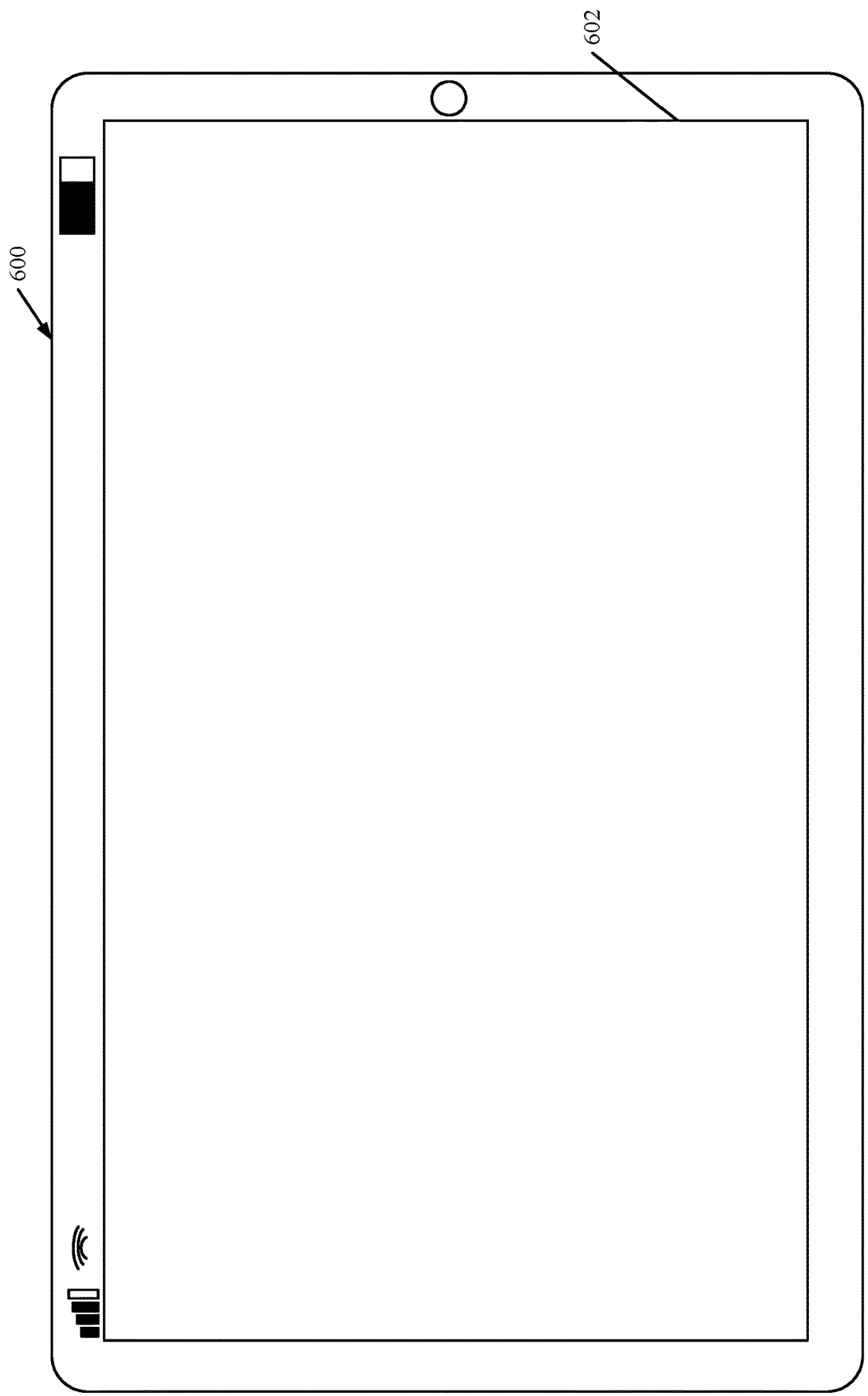
Figure 8:
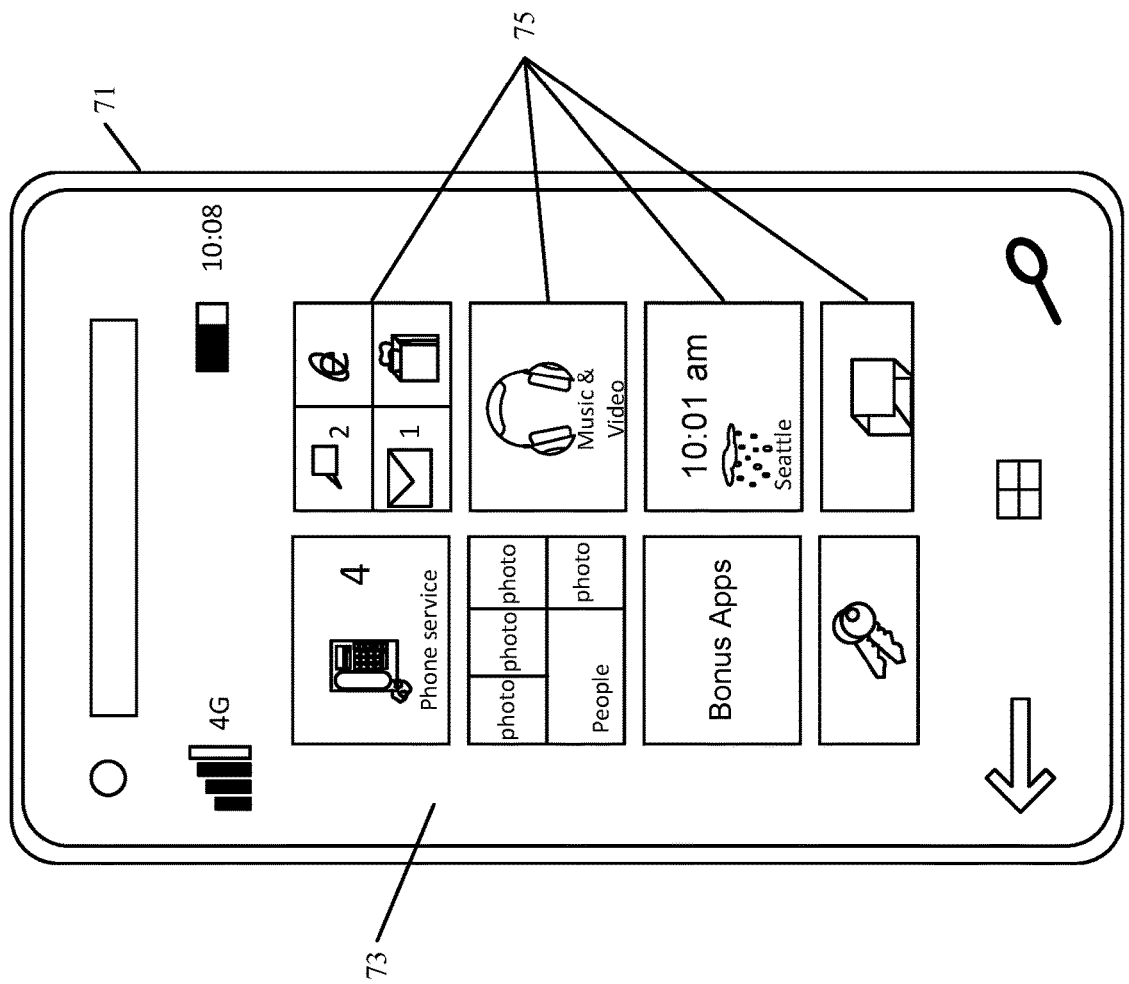

FIG. 6 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of work machine 102 for use in generating, processing, or displaying the stool width and position data. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor 228 from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17. Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, contact or phonebook application 43, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one embodiment in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 provides an additional example of devices 16 that can be used, although others can be used as well. The phone in FIG. 8 is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
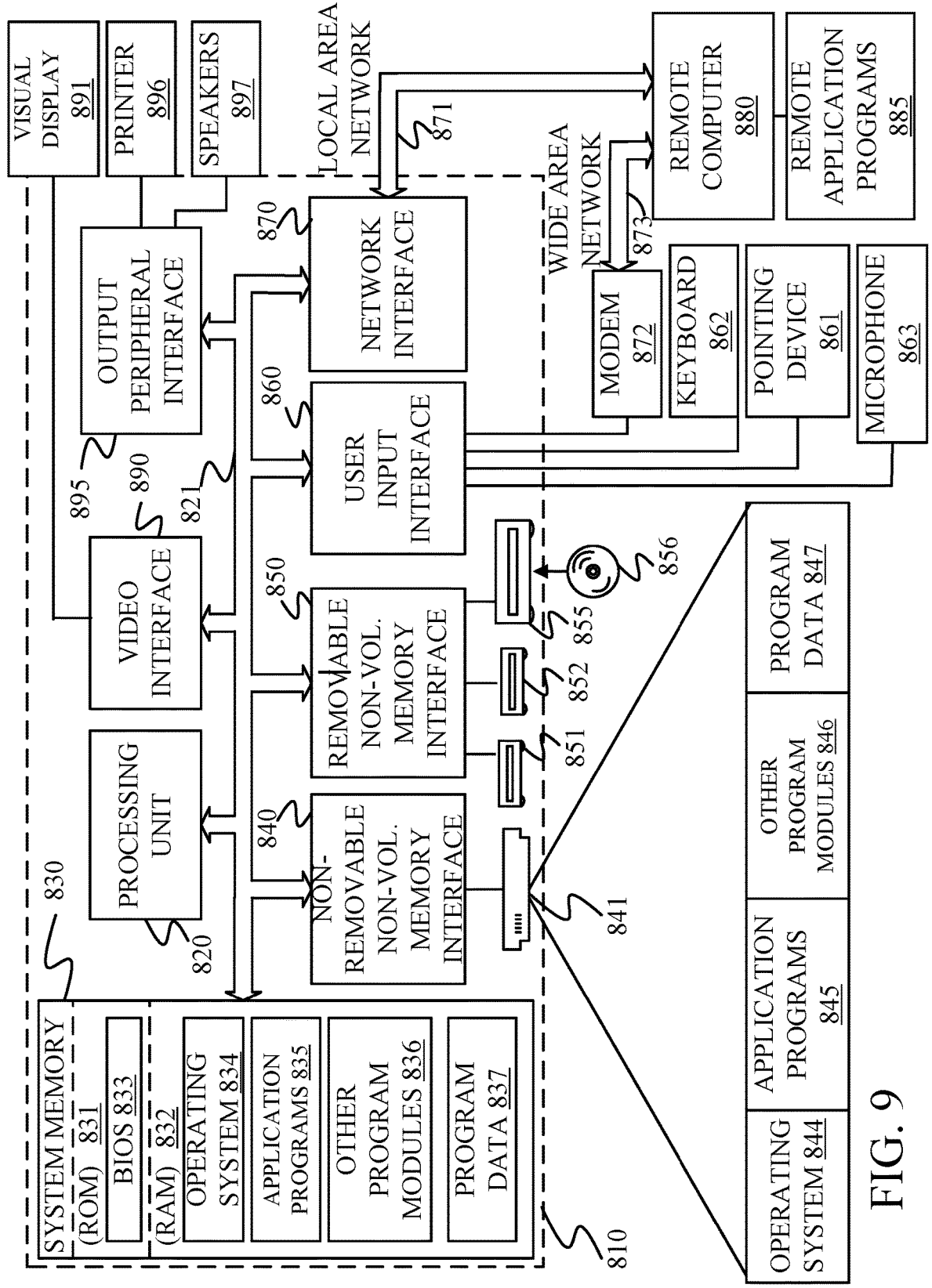
FIG. 9 is a block diagram showing one example of a computing environment that can be used in the mobile machine and/or in the architectures shown in the previous figures.

FIG. 9 is one embodiment of a computing environment in which elements of FIG. 2, or parts of it, (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor 228), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile work machine, comprising:
a load carrying mechanism that carries a load;
a position detection system that detects a position of a target area for the load, relative to a position of the load, and generates a position signal indicative of the detected position;
a sensor system that senses a physical boundary of the load and generates a load boundary signal indicative of the physical boundary of the load and that senses at least a partial physical boundary of the target zone and generates a target zone boundary signal indicative of the at least partial physical boundary of the target zone;
a path calculation component that generates a travel path for the mobile work machine to move the load to the target zone, so the physical boundary of the load avoids intersection with the at least partial physical boundary of the target zone, based on the position signal, the load boundary signal and the target zone boundary signal;
a controllable subsystem; and
a control system that controls the controllable subsystem of the mobile work machine to move the mobile work machine along the travel path.

Example 2 is the mobile work machine of any or all previous examples wherein the sensor system comprises:
a non-contact sensor configured to sense a sensed variable and generate at least one of the target zone boundary signal or the load boundary signal based on the sensed variable.

Example 3 is the mobile work machine of any or all previous examples wherein the non-contact sensor comprises:
an optical sensor configured to sense an optical characteristic and generate at least one of the target zone boundary signal or the load boundary signal based on the sensed optical characteristic.

Example 4 is the mobile work machine of any or all previous examples wherein the optical sensor comprises:
a vision-based sensor configured to sense a visual characteristic and generate at least one of the target zone boundary signal or the load boundary signal based on the sensed visual characteristic.

Example 5 is the mobile work machine of any or all previous examples and further comprising:
prediction logic configured to generate a motion signal indicative of a movement characteristic of the mobile work machine, as it moves along that travel path, based on sensed physical characteristics of the load, to avoid a hazard condition, and wherein the control system is configured to control the controllable subsystem based on the movement characteristic indicated by the motion signal.

Example 6 is the mobile work machine of any or all previous examples wherein the controllable subsystem comprises:
a steering and propulsion system that is controlled to steer and propel movement of the mobile work machine.

Example 7 is the mobile work machine of any or all previous examples wherein the prediction logic is configured to generate the motion signal indicative of an acceleration limit that the mobile machine is to experience as it travels along the travel path and wherein the control system is configured to control the steering and propulsion system to maintain the acceleration experienced by the mobile work machine within the acceleration limit indicated by the movement signal.

Example 8 is the mobile work machine of any or all previous examples wherein the sensor system comprises:
an obstruction sensor configured to sense a location and boundary of objects proximate the travel path and generate an obstruction signal indicative of the sensed location and boundary of the objects.

Example 9 the mobile work machine of any or all previous examples wherein the prediction logic is configured to receive the obstruction signal and generate the motion signal indicative of a travel path modification that the mobile machine is to follow as it travels to avoid contact with the objects sensed by the obstruction sensor.

Example 10 is the mobile work machine of any or all previous examples wherein the controllable subsystem comprises:
a load carrying actuator configured to change a position of the load carrying mechanism relative to a frame of the mobile work machine and wherein the control system is configured to control the load carrying actuator based on the travel path modification indicated by the motion signal to avoid contact with the objects.

Example 11 is the mobile work machine of any or all previous examples wherein the control system is configured to synchronize control of multiple different controllable subsystems based on the motion signal to avoid the hazard condition.

Example 12 is the mobile work machine of any or all previous examples wherein the sensor system comprises:
a grip quality sensor configured to sense a characteristic of a grip quality and generate a grip quality signal indicative of a quality of a grip of the load carrying mechanism on the load, the prediction logic being configured to generate the motion signal based on the grip quality signal.

Example 13 is a machine control system on a mobile work machine with a load carrying mechanism that carries a load, the machine control system comprising:
  a position detection system that detects a position of a target area for the load, relative to a position of the load, and generates a position signal indicative of the detected position;
  a sensor system that senses a physical boundary of the load and generates a load boundary signal indicative of the physical boundary of the load and that senses at least a partial physical boundary of the target zone and generates a target zone boundary signal indicative of the at least partial physical boundary of the target zone;
  a path calculation component that generates a travel path for the mobile work machine to move the load to the target zone, so the physical boundary of the load avoids intersection with the at least partial physical boundary of the target zone, based on the position signal, the load boundary signal and the target zone boundary signal; and
  a control system that controls a controllable subsystem of the mobile work machine to move along the travel path.

Example 14 is the machine control system of any or all previous examples wherein the sensor system comprises:
  an optical sensor configured to sense an optical characteristic and generate at least one of the target zone boundary signal or the load boundary signal based on the sensed optical characteristic.

Example 15 is the machine control system of any or all previous examples wherein the optical sensor comprises:
  a vision-based sensor configured to sense a visual characteristic and generate at least one of the target zone boundary signal or the load boundary signal based on the sensed visual characteristic.

Example 16 is the machine control system of any or all previous examples and further comprising:
  prediction logic configured to generate a motion signal indicative of a movement characteristic of the mobile work machine, as it moves along that travel path, based on sensed physical characteristics of the load, to avoid a hazard condition, and wherein the control system is configured to control the controllable subsystem based on the movement characteristic indicated by the motion signal.

Example 17 is the machine control system of any or all previous examples wherein the controllable subsystem comprises a steering and propulsion system that is controlled to steer and propel movement of the mobile work machine and wherein the prediction logic is configured to generate the motion signal indicative of an acceleration limit that the mobile machine is to experience as it travels along the travel path and wherein the control system is configured to control the steering and propulsion system to maintain the acceleration experienced by the mobile work machine within the acceleration limit indicated by the movement signal.

Example 18 the machine control system of any or all previous examples wherein the sensor system comprises:
  an obstruction sensor configured to sense a location and boundary of objects proximate the travel path and generate an obstruction signal indicative of the sensed location and boundary of the objects wherein the prediction logic is configured to receive the obstruction signal and generate the motion signal indicative of a travel path modification that the mobile machine is to follow as it travels to avoid contact with the objects sensed by the obstruction sensor.

Example 19 is the machine control system of any or all previous examples wherein the controllable subsystem comprises a load carrying actuator configured to change a position of the load carrying mechanism relative to a frame of the mobile work machine and wherein the control system is configured to control the load carrying actuator based on the travel path modification indicated by the motion signal to avoid contact with the objects.

Example 20 is a method of controlling a mobile work machine that has a load carrying mechanism that carries a load, the method comprising:
  detecting a position of a target area for the load, relative to a position of the load;
  generating a position signal indicative of the detected position;
  sensing a physical boundary of the load;
  generating a load boundary signal indicative of the physical boundary of the load;
  sensing at least a partial physical boundary of the target zone;
  generating a target zone boundary signal indicative of the at least partial physical boundary of the target zone;
  generating a travel path for the mobile work machine to move the load to the target zone, so the physical boundary of the load avoids intersection with the at least partial physical boundary of the target zone, based on the position signal, the load boundary signal and the target zone boundary signal; and
  controlling a controllable subsystem of the mobile work machine to move the mobile work machine along the travel path.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine, comprising:
  a load carrying mechanism that carries a load;
  a position detection system that detects a position of a target zone for the load, relative to a position of the load, and generates a position signal indicative of the detected position;
  a sensor system that senses a physical boundary of the load and generates a load boundary signal indicative of the physical boundary of the load and that senses at least a partial physical boundary of the target zone and generates a target zone boundary signal indicative of the at least partial physical boundary of the target zone;
  a path calculation component that generates a travel path for the mobile work machine from a starting point to the target zone to move the load to the target zone, the travel path being generated so the physical boundary of the load avoids intersection with the at least partial physical boundary of the target zone, based on the position signal, the load boundary signal and the target zone boundary signal;
  a controllable subsystem; and
  a control system that automatically controls the controllable subsystem of the mobile work machine to move the mobile work machine along the generated travel path from the starting point to the target zone.

2. The mobile work machine of claim 1 wherein the sensor system comprises:

a non-contact sensor configured to sense a sensed variable and generate at least one of the target zone boundary signal or the load boundary signal based on the sensed variable.

3. The mobile work machine of claim 2 wherein the non-contact sensor comprises:
an optical sensor configured to sense an optical characteristic and generate at least one of the target zone boundary signal or the load boundary signal based on the sensed optical characteristic.

4. The mobile work machine of claim 3 wherein the optical sensor comprises:
a vision-based sensor configured to sense a visual characteristic and generate at least one of the target zone boundary signal or the load boundary signal based on the sensed visual characteristic.

5. The mobile work machine of claim 2 and further comprising:
prediction logic configured to generate a motion signal indicative of a movement characteristic of the mobile work machine, as it moves along the generated travel path, based on sensed physical characteristics of the load, to avoid a hazard condition, and wherein the control system is configured to control the controllable subsystem based on the movement characteristic indicated by the motion signal.

6. The mobile work machine of claim 5 wherein the controllable subsystem comprises:
a steering and propulsion system that is controlled to steer and propel movement of the mobile work machine.

7. The mobile work machine of claim 6 wherein the prediction logic is configured to generate the motion signal indicative of an acceleration limit that the mobile machine is to experience as it travels along the generated travel path and wherein the control system is configured to control the steering and propulsion system to maintain the acceleration experienced by the mobile work machine within the acceleration limit indicated by the movement signal.

8. The mobile work machine of claim 5 wherein the sensor system comprises:
an obstruction sensor configured to sense a location and boundary of objects proximate the generated travel path and generate an obstruction signal indicative of the sensed location and boundary of the objects.

9. The mobile work machine of claim 8 wherein the prediction logic is configured to receive the obstruction signal and generate the motion signal indicative of a travel path modification that the mobile machine is to follow as it travels to avoid contact with the objects sensed by the obstruction sensor.

10. The mobile work machine of claim 9 wherein the controllable subsystem comprises:
a load carrying actuator configured to change a position of the load carrying mechanism relative to a frame of the mobile work machine and wherein the control system is configured to control the load carrying actuator based on the travel path modification indicated by the motion signal to avoid contact with the objects.

11. The mobile work machine of claim 5 wherein the control system is configured to synchronize control of multiple different controllable subsystems based on the motion signal to avoid the hazard condition.

12. The mobile work machine of claim 5 wherein the sensor system comprises:
a grip quality sensor configured to sense a characteristic of a grip quality and generate a grip quality signal indicative of a quality of a grip of the load carrying mechanism on the load, the prediction logic being configured to generate the motion signal based on the grip quality signal.

13. A machine control system on a mobile work machine with a load carrying mechanism that carries a load, the machine control system comprising:
a position detection system that detects a position of a target zone for the load, relative to a position of the load, and generates a position signal indicative of the detected position;
a sensor system that senses a physical boundary of the load and generates a load boundary signal indicative of the physical boundary of the load and that senses at least a partial physical boundary of the target zone and generates a target zone boundary signal indicative of the at least partial physical boundary of the target zone;
a path calculation component that generates a travel path for the mobile work machine to move the load from a starting point to the target zone, the travel path being generated so the physical boundary of the load avoids intersection with the at least partial physical boundary of the target zone, based on the position signal, the load boundary signal and the target zone boundary signal; and
a control system that automatically controls a controllable subsystem of the mobile work machine to move along the generated travel path from the starting point to the target zone.

14. The machine control system of claim 13 wherein the sensor system comprises:
an optical sensor configured to sense an optical characteristic and generate at least one of the target zone boundary signal or the load boundary signal based on the sensed optical characteristic.

15. The machine control system of claim 14 wherein the optical sensor comprises:
a vision-based sensor configured to sense a visual characteristic and generate at least one of the target zone boundary signal or the load boundary signal based on the sensed visual characteristic.

16. The machine control system of claim 15 and further comprising:
prediction logic configured to generate a motion signal indicative of a movement characteristic of the mobile work machine, as it moves along the generated travel path, based on sensed physical characteristics of the load, to avoid a hazard condition, and wherein the control system is configured to control the controllable subsystem based on the movement characteristic indicated by the motion signal.

17. The machine control system of claim 16 wherein the controllable subsystem comprises a steering and propulsion system that is controlled to steer and propel movement of the mobile work machine and wherein the prediction logic is configured to generate the motion signal indicative of an acceleration limit that the mobile machine is to experience as it travels along the generated travel path and wherein the control system is configured to control the steering and propulsion system to maintain the acceleration experienced by the mobile work machine within the acceleration limit indicated by the movement signal.

18. The machine control system of claim 16 wherein the sensor system comprises:
an obstruction sensor configured to sense a location and boundary of objects proximate the generated travel path and generate an obstruction signal indicative of the sensed location and boundary of the objects wherein the prediction logic is configured to receive the obstruction signal and generate the motion signal indicative of a travel path modification that the mobile machine is to follow as it travels to avoid contact with the objects sensed by the obstruction sensor.

19. The machine control system of claim 18 wherein the controllable subsystem comprises a load carrying actuator configured to change a position of the load carrying mechanism relative to a frame of the mobile work machine and wherein the control system is configured to control the load carrying actuator based on the travel path modification indicated by the motion signal to avoid contact with the objects.

20. A method of controlling a mobile work machine that has a load carrying mechanism that carries a load, the method comprising:
   detecting a position of a target zone for the load, relative to a position of the load;
   generating a position signal indicative of the detected position;
   sensing a physical boundary of the load;
   generating a load boundary signal indicative of the physical boundary of the load;
   sensing at least a partial physical boundary of the target zone;
   generating a target zone boundary signal indicative of the at least partial physical boundary of the target zone;
   sensing a position of an obstruction between the mobile work machine at a starting point and the target zone;
   generating an obstruction signal indicative of the position of the obstruction between the mobile work machine at the starting point and the target zone;
   generating a travel path for the mobile work machine to move the load from the starting point to the target zone, the travel path being generated so the physical boundary of the load avoids intersection with the at least partial physical boundary of the target zone and the obstruction between the starting point and the target zone, based on the position signal, the load boundary signal, the target zone boundary signal, and the obstruction signal; and
   controlling, automatically, a controllable subsystem of the mobile work machine to move the mobile work machine along the generated travel path from the starting point to the target zone.

* * * * *